US009497376B2

(12) United States Patent
Bostick et al.

(10) Patent No.: US 9,497,376 B2
(45) Date of Patent: Nov. 15, 2016

(54) DISCRIMINATING VISUAL RECOGNITION PROGRAM FOR DIGITAL CAMERAS (71) Applicant: International Business Machines Corporation, Armonk, NY (US)

(72) Inventors: James E. Bostick, Cedar Park, TX (US); Hernan A. Cunico, Holly Springs, NC (US); John M. Ganci, Jr., Cary, NC (US); Martin G. Keen, Cary, NC (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 15/093,182

(22) Filed: Apr. 7, 2016

(65) Prior Publication Data

US 2016/0219214 A1 Jul. 28, 2016

Related U.S. Application Data (63) Continuation of application No. 14/605,073, filed on Jan. 26, 2015, now Pat. No. 9,344,615.

(51) Int. Cl.
*H04N 5/232* (2006.01)
*G06T 7/00* (2006.01)
(Continued)

(52) U.S. Cl.
CPC ........ *H04N 5/23219* (2013.01); *G06K 7/1413* (2013.01); *G06K 7/1417* (2013.01);
(Continued)

(58) Field of Classification Search
CPC ............. H04N 2005/4441; H04N 2005/4405; H04N 2005/4407; H04N 2005/4423; H04N 2005/4435; H04N 2005/4439; H04N 5/4403; H04N 5/232; H04N 5/23219; H04N 7/185; H04N 2005/4425; H04N 2005/4428; H04N 2005/4432; H04N 2005/4433; H04N 2005/4442; H04N 2005/4444; H04N 21/4126; H04N 21/42204; H04N 21/42207; H04N 21/42208; H04N 21/42218; H04N 21/42219; H04N 21/4222; H04N 21/42224; H04N 21/42225; H04N 21/42226; H04N 21/441; H04N 21/42228; H04N 21/60; H04N 21/63; H04N 21/8186; H04N 2201/0075; H04N 5/23203; H04N 5/44582; B25J 19/02; B25J 19/021; B25J 19/023; B25J 5/00; B60L 15/40; B60T 7/16
USPC ....................................... 348/222.1
See application file for complete search history.

(56) References Cited

U.S. PATENT DOCUMENTS 5,247,327 A * 9/1993 Suzuka .................. G03B 17/38
396/109
5,517,276 A * 5/1996 Higaki ..................... G02B 7/32
396/109

(Continued)

FOREIGN PATENT DOCUMENTS

WO 2013174068 A1 11/2013

OTHER PUBLICATIONS

"CamMe—Best App for Taking Selfies", © 2008 PointGrab ltd.,Updated: Apr. 18, 2014, Version: 2.12, <https://itunes.apple.com/us/app/camme-best-app-for-taking/id597208969?mt=8>, 2 pages.

(Continued)

*Primary Examiner* — Pritham Prabhakher
(74) *Attorney, Agent, or Firm* — Bryan D. Wells; David M. Quinn (57) ABSTRACT

Control of a camera is provided. Data describing a visual key is generated. The data describing the visual key is transmitted. The visual key is identified. A person who is in possession of the visual key is identified. The person is associated with the visual key, wherein the person is authorized to control the camera using gestures. A gesture of the person is recognized. The gesture causes a program to execute a command that corresponds to the gesture, wherein the command cause the camera to perform a function.

20 Claims, 3 Drawing Sheets

(51) Int. Cl.
*G06K 9/62* (2006.01)
*G06K 9/00* (2006.01)
*G06K 9/78* (2006.01)
*G06K 7/14* (2006.01)

(52) U.S. Cl.
CPC ......... *G06K9/00335* (2013.01); *G06K 9/6202* (2013.01); *G06K 9/78* (2013.01); *G06T 7/0081* (2013.01); *G06T 7/0085* (2013.01); *G06T 2207/10016* (2013.01); *G06T 2207/30196* (2013.01)

(56) References Cited

U.S. PATENT DOCUMENTS

| | | | | |
|---|---|---|---|---|
| 6,809,759 | B1* | 10/2004 | Chiang | H04N 5/23293 348/211.2 |
| 7,272,305 | B2* | 9/2007 | Stavely | H04N 5/23203 348/211.2 |
| 8,078,045 | B2* | 12/2011 | Marcus | G03B 17/38 348/211.13 |
| 8,593,534 | B2 | 11/2013 | Gardiner et al. | |
| 8,866,953 | B2* | 10/2014 | Cho | G06K 9/2063 348/333.02 |
| 9,253,452 | B2* | 2/2016 | Ross | G11B 27/11 |
| 2003/0165192 | A1* | 9/2003 | Kitta | H04N 5/232 375/240.01 |
| 2004/0008263 | A1* | 1/2004 | Sayers | H04N 5/23203 348/207.11 |
| 2004/0196400 | A1 | 10/2004 | Stavely et al. | |
| 2005/0052539 | A1* | 3/2005 | Stavely | H04N 5/23203 348/211.4 |
| 2007/0177023 | A1* | 8/2007 | Beuhler | G08B 13/19645 348/211.3 |
| 2008/0143481 | A1* | 6/2008 | Abraham | G06Q 30/02 340/10.1 |
| 2008/0240697 | A1* | 10/2008 | Marcus | G03B 17/38 396/58 |
| 2011/0267172 | A1* | 11/2011 | Riechel | G06Q 10/0833 340/10.1 |
| 2012/0209749 | A1* | 8/2012 | Hammad | G06Q 30/06 705/27.1 |
| 2012/0309532 | A1 | 12/2012 | Ambrus et al. | |
| 2013/0027569 | A1* | 1/2013 | Parulski | H04N 5/23219 348/207.1 |
| 2013/0044912 | A1* | 2/2013 | Kulkarni | G06K 9/00671 382/103 |
| 2014/0146192 | A1* | 5/2014 | Zhou | H04N 5/23203 348/211.2 |
| 2014/0285686 | A1* | 9/2014 | Cho | H04N 5/232 348/231.99 |
| 2015/0015741 | A1* | 1/2015 | Kim | H04N 5/23293 348/239 |
| 2015/0049206 | A1* | 2/2015 | Eshita | H04N 5/2251 348/207.11 |
| 2015/0078727 | A1* | 3/2015 | Ross | H04N 7/188 386/227 |
| 2015/0116520 | A1* | 4/2015 | Baym | H04N 5/44 348/211.2 |
| 2015/0172539 | A1* | 6/2015 | Neglur | H04N 5/23206 348/207.1 |
| 2015/0220154 | A1* | 8/2015 | Midholt | G06F 3/014 345/156 |
| 2015/0229837 | A1* | 8/2015 | Her | H04N 5/23219 348/222.1 |

OTHER PUBLICATIONS

Chu, Shaowei; "Interacting with a Self-portrait Camera Using Gestures", Graduate School of Systems and Information Engineering, University of Tsukuba, Jul. 2013, <http://www.iplab.cs.tsukuba.ac.jp/paper/doctor/chu_doctorpdf>, 94 pages.

"iBeacon", From Wikipedia, the free encyclopedia, last modified on Oct. 16, 2014, <http://en.wikipedia.org/wiki/IBeacon>, 7 pages.

"Object Recognition/Gesture Recognition Software", Copyright © 2013 PUX Corporation, <http://www.pux.co.jp/en/softsensor/gesture.html>, 2 pages.

"Remote Viewfinder", Samsung Electronics DigitalImaging, updated Mar. 26, 2013, © 2014 Google, <https://play.google.com/store/apps/details?id=com.samsung.app>, 4 pages.

Tomkins, Mike; "Samsung MV900F Review", Imaging Resource © 1998-2014, <http://www.imaging-resource.com/PRODS/samsung-mv900f/samsung-mv900fA.HTM>, 3 pages.

Bostick et al., "Discriminating Visual Recognition Program for Digital Cameras", U.S. Appl. No. 14/605,073, filed Jan. 26, 2015, 28 pages.

* cited by examiner

FIG. 4

DISCRIMINATING VISUAL RECOGNITION PROGRAM FOR DIGITAL CAMERAS

BACKGROUND OF THE INVENTION

The present invention relates generally to the field of digital photography, and more particularly to control methods for cameras using human gestures.

Self-timers are a standard feature on most modern cameras. In addition, modern portable electronic devices, such as cell phones, tablets, and laptops may include digital cameras and may also include self-timer software. In general, a photographer can use a self-timer to allow the photographer to be included in a photograph. The photographer typically positions a camera in a desired location and orientation and then sets the self-timer for a few seconds. Typically, the photographer must be physically present at the camera to set the self-timer. The photographer must then attempt to quickly move into position for the photograph before the countdown expires. When the countdown expires, the camera takes a photograph.

SUMMARY

According to one embodiment of the present disclosure, a method for controlling a camera is provided. The method includes generating, by one or more computer processors, data describing a visual key; transmitting, by one or more computer processors, the data describing the visual key; capturing, by one or more computer processors, a first image that includes the visual key; identifying, by one or more computer processors, the visual key in the first image; determining, by one or more computer processors, an outline of a person in the first image based, at least in part, on at least one of edge detection code and edge matching code; determining, by one or more computer processors, that a percentage on an area of the visual key that overlaps with an area defined by the outline of the person exceeds a threshold percentage, and in response, associating, by one or more computer processors, the visual key with the person, wherein an association with the visual key authorizes the person to control a camera; capturing, by one or more computer processors, a second image that includes a gesture of the person, wherein the first image does not include the gesture; and responsive to recognizing, by one or more computer processors, the gesture of the person in the second image, executing, by one or more computer processors, a command that corresponds to the gesture, wherein the command causes the camera to perform a function.

According to another embodiment of the present disclosure, a computer program product for controlling a camera is provided. The computer program product comprises a computer readable storage medium and program instructions stored on the computer readable storage medium. The program instructions include program instructions to generate data describing a visual key; program instructions to transmit the data describing the visual key; program instructions to capture a first image that includes the visual key; program instructions to identify the visual key in the first image; program instructions to determine an outline of a person in the first image based, at least in part, on at least one of edge detection code and edge matching code; program instructions to determine that a percentage on an area of the visual key that overlaps with an area defined by the outline of the person exceeds a threshold percentage, and in response, execute program instructions to associate the visual key with the person, wherein an association with the visual key authorizes the person to control a camera; program instructions to capture a second image that includes a gesture of the person, wherein the first image does not include the gesture; and program instructions to, responsive to recognizing the gesture of the person in the second image, execute a command that corresponds to the gesture, wherein the command causes the camera to perform a function.

According to another embodiment of the present disclosure, a computer system for controlling a camera is provided. The computer system includes one or more computer processors, one or more computer readable storage media, and program instructions stored on the computer readable storage media for execution by at least one of the one or more processors. The program instructions include program instructions to generate data describing a visual key; program instructions to transmit the data describing the visual key; program instructions to capture a first image that includes the visual key; program instructions to identify the visual key in the first image; program instructions to determine an outline of a person in the first image based, at least in part, on at least one of edge detection code and edge matching code; program instructions to determine that a percentage on an area of the visual key that overlaps with an area defined by the outline of the person exceeds a threshold percentage, and in response, execute program instructions to associate the visual key with the person, wherein an association with the visual key authorizes the person to control a camera; program instructions to capture a second image that includes a gesture of the person, wherein the first image does not include the gesture; and program instructions to, responsive to recognizing the gesture of the person in the second image, execute a command that corresponds to the gesture, wherein the command causes the camera to perform a function.

DETAILED DESCRIPTION

The present disclosure recognizes a need to remotely activate and control cameras. In particular, a need exists to remotely control camera self-timers. Many cameras include a digital or analog self-timer that is physically integrated with the camera and that, in some cases, allows the photographer to customize the length of the delay. While traditional camera self-timers allows a photographer to appear in a picture with his or her subject(s) under ideal conditions, they are generally difficult to use. In general, a photographer activates the self-timer at the camera and then quickly move into position for the photograph. Any number of factors, however, may intervene and cause the photographer to be out of position or absent from the photograph entirely. Without the use of a remote viewfinder, the photographer is also unable to compose a photograph with him or herself included in it. Moreover, the photographer may disturb his or her subjects as he or she attempts to position him or herself as intended. Although modern mobile electronic devices, such as smartphones, may be able to function as remote viewfinders and allow photographers to trigger self-timers remotely, it is desirable to hide the device out of view of the camera before the countdown expires. While an improvement over legacy systems, an attempt to hide the device may still risk placing the photographer out of position for the photograph, or through his or her attempts to hide the device, disturb his or her subject(s) such that they are out of position for the photograph. Visual recognition and visual tracking software provides an improvement by enabling a photographer to control a camera using his or her gestures. However, photographic subjects can intentionally or inadvertently issue commands through their gestures. Embodiments of the present invention provide for restricting the ability to issue gestural commands to the photographer (or a different person who is authorized to issue gestural commands).

The present disclosure describes embodiments that provide a way to restrict the ability to issue gestural commands to the photographer. In one embodiment, for example, a photographer uses a visual key to pair a mobile electronic device that is in his or her possession with a camera. Examples of suitable mobile electronic devices include, but are not limited to, smart phones and smart watches. The photographer can use the mobile electronic device to request a visual key from the camera. The camera generates a visual key in response to the request. The visual key can be unique to each pairing instance. The camera transmits the visual key to the mobile electronic device over a network. After receiving the visual key, the photographer displays the visual key on a screen and orients the screen so that the camera can see the visual key. The camera executes a visual recognition program that begins to search for the visual key. If the visual recognition program identifies the correct visual key, the visual recognition program associates the visual key with the person in possession of the mobile electronic device, e.g., the photographer. The visual recognition software can use boundary recognition, object recognition, or any other visual recognition technique that is known in the art to associate the visual key with the photographer. After the visual recognition program associates the visual key with the photographer, the visual recognition program automatically tracks the photographer and searches for recognizable gestures. In some embodiments, the photographer, at his or her discretion, may disable or hide the visual key once the visual recognition program has associated the photographer with the visual key. The camera can, in some embodiments, indicate when the visual recognition program has made an association between the visual key and the photographer. In some embodiments, the camera transmits an image to the mobile electronic device that indicates the person whom the visual recognition program associates with the visual key. In this case, the photographer may view the image to determine if the visual recognition software is operating properly. If the visual recognition software recognizes a gesture that is associated with a function on the camera, the visual recognition software causes the camera to execute the function. The visual recognition software ignores the gestures of other people in the photograph.

Figure 1:
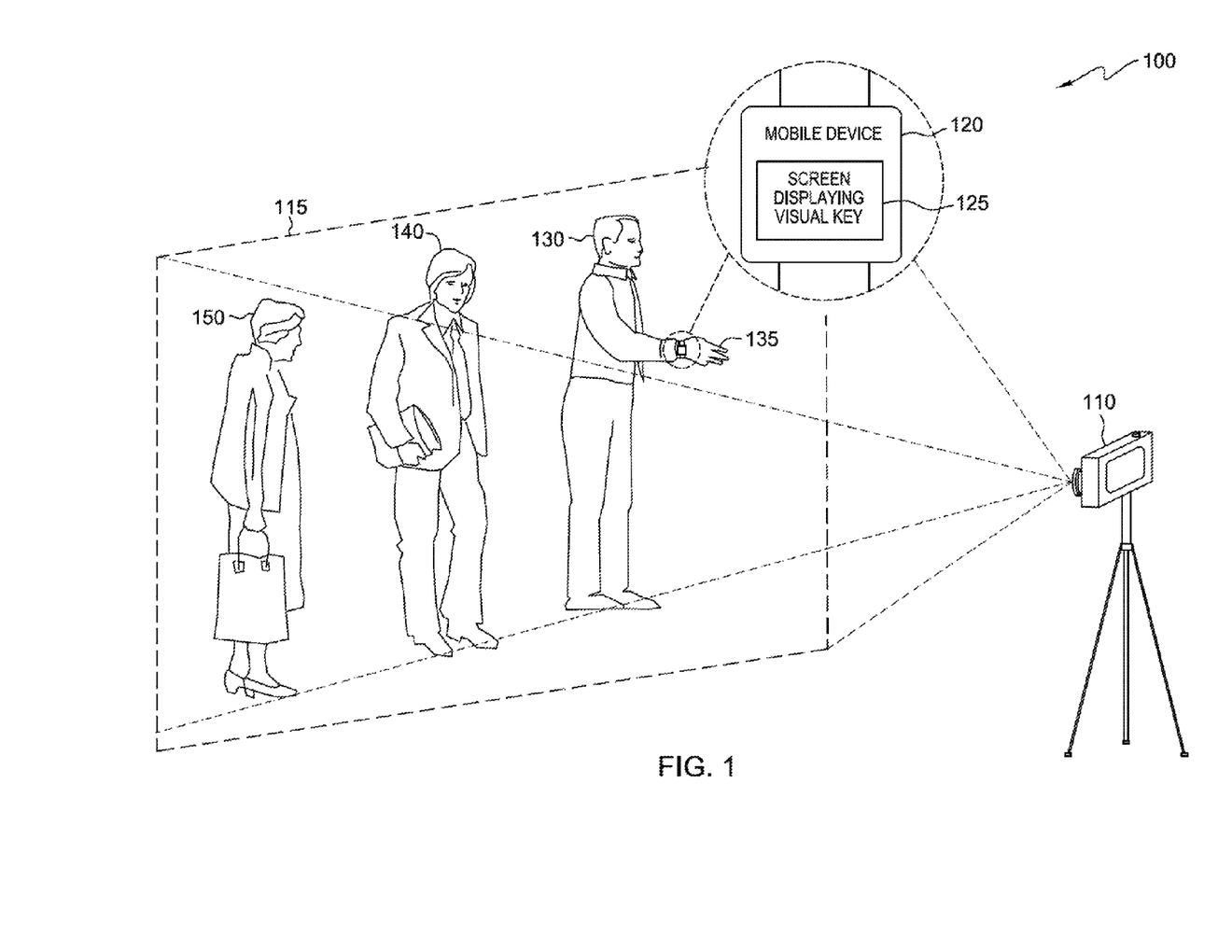
FIG. 1 is a diagram illustrating a photographic system, in accordance with an embodiment of the present disclosure.

The present disclosure will now be described in detail with reference to the Figures. FIG. 1 illustrates a photographic system in accordance with an embodiment of the present disclosure. For example, FIG. 1 illustrates one embodiment of photographic system 100. Photographic system 100 includes camera 110, mobile device 120, subject 130, subject 140, and subject 150. Camera 110 has field of view (FOV) 115. Mobile device 120 includes screen 125 that is capable of displaying a visual key. Subject 130 is shown issuing gesture 135.

In various embodiments, camera 110 is a computing device that can be a standalone mobile electronic device, a camera, a smart phone, a laptop computer, a tablet computer, a netbook computer, a personal computer (PC), a desktop computer, or a television. In general, camera 110 can be any computing device or a combination of devices with the capability to take photographs, electronically communicate with mobile device 120, and with access to and/or capable of executing visual recognition software. Camera 110 can include internal and external hardware components, as depicted and described in further detail with respect to FIG. 4. Hardware and software components of camera 110 determine the angular dimensions of field of view 115. The angular dimensions of field of view 115 depend on factors such as the angle of view of a lens, the focal length of the lens, and the size of a digital image sensor.

In various embodiments, mobile device 120 is a computing device that can be a standalone mobile electronic device, an electronic watch, a smart watch, a mobile telephone, a smart phone, a tablet computer, or any wearable electronic device. In general, mobile device 120 can be any computing device or combination of devices with the capability to display a visual key and electronically communicate with camera 110.

FIG. 1 shows subject 130, subject 140, and subject 150 within field of view 115 in accordance with an embodiment of the present disclosure. In this embodiment, subject 130 wears mobile device 120 on a wrist as a smart watch. Screen 125 of mobile device 120 is shown within field of view 115 and oriented toward camera 110 such that camera 110 can see screen 125. If screen 125 displays a visual key, camera 110 can identify the visual key. FIG. 1 also shows subject 130 issuing gesture 135. In this embodiment, gesture 135 includes extending three finger from a hand that is proximate to mobile device 120. Gesture 135 causes camera 110 to execute a command. For example, gesture 135 activates a self-timer of camera 110 and causes the self-timer to countdown for three seconds. In this and other embodiments, other gestures cause camera 110 to execute other commands. For example, the self-timer can be set to countdown for a different number of seconds that corresponds to a different number of extended fingers, e.g., five extended fingers causes the self-timer to countdown for five seconds. In addition to self-timers, gestures can enable remote control of other features of camera 110, such as remote control of a flash, a "red-eye-reduction" feature, or a focal length, i.e., the amount of "zoom."

Figure 2:
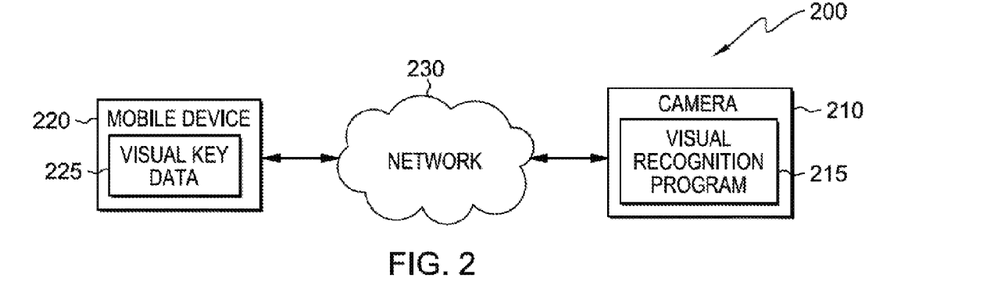
FIG. 2 is a functional block diagram illustrating a computing environment within the photographic system of FIG. 1, in accordance with an embodiment of the present disclosure.

FIG. 2 is a functional block diagram illustrating a computing environment, in accordance with an embodiment of the present disclosure. For example, FIG. 2 is a functional block diagram illustrating photographic system 100 within computing environment 200. Computing environment 200 includes camera 110 and mobile device 120 connected over network 230. Camera 110 includes visual recognition program 215. Mobile device 120 includes visual key data 225.

In the embodiment shown in FIG. 2, visual recognition program 215 is stored on camera 110. In other embodiments, visual recognition program 215 resides on another computing device, provided that camera 110 can access and is accessible by visual recognition program 215. In yet other embodiments, visual recognition program 215 is stored externally and accessed through a communication network, such as network 230. Network 230 can be, for example, a local area network (LAN), a wide area network (WAN) such as the Internet, or a combination of the two, and can include wired, wireless, fiber optic or any other connection known in the art. In general, network 230 can be any combination of connections and protocols that will support communications between camera 110 and mobile device 120, in accordance with a desired embodiment of the present invention.

In the embodiment shown in FIG. 2, visual key data 225 is stored on mobile device 120. In other embodiments, visual key data 225 resides on another computing device, provided that mobile device 120 can access visual key data 225. In yet other embodiments, visual key data 225 is stored externally and accessed through a communication network, such as network 230.

Visual recognition program 215 operates, at least in part, to identify a visual key, i.e., a representation of visual key data 225, within field of view 115. Visual recognition program 215 associates the visual key with a photographer, who is a person in physical possession of the visual key. In some embodiments, visual recognition program 215 may track the photographer using any visual recognition technique known in the art. If the photographer issues a gesture that visual recognition program 215 recognizes, visual recognition program 215 causes camera 110 to execute a program that is associated with the gesture.

In some embodiments, mobile device 120 includes a user interface, which executes locally on mobile device 120 and operates to provide a graphical or text-based user interface to a user of mobile device 120. In some embodiments, the user interface enables a user of mobile device 120 to interact with camera 110 via network 230. In various examples, the user interacts with camera 110 through mobile device 120 in order to control camera 110 remotely and/or view objects within field of view 115.

Figure 3:
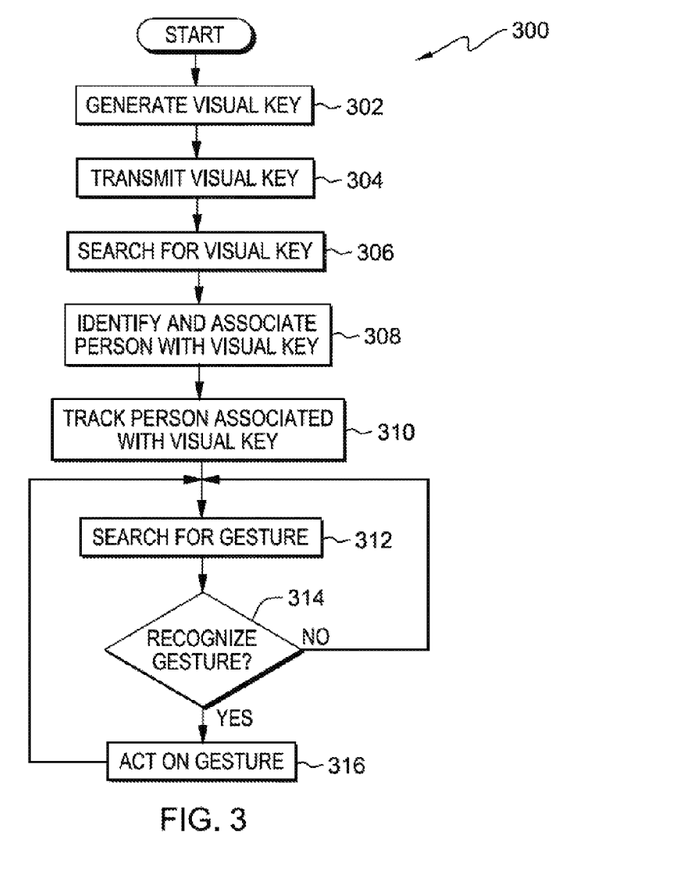
FIG. 3 is a flowchart depicting operations for controlling a digital camera, on a computing device within the computing environment of FIG. 2, in accordance with an embodiment of the present disclosure.

FIG. 3 is a flowchart depicting operations on a computing device within the computing environment of FIG. 2 for controlling a camera using gestures, in accordance with an embodiment of the present disclosure. For example, FIG. 3 is a flowchart depicting operations 300 of visual recognition program 215, on camera 110 within computing environment 200.

In operation 302, visual recognition program 215 generates visual key data 225 that describes a visual key. Visual recognition program 215 generates visual key data 225 in response to a request to pair with a mobile device, such as mobile device 120. In some embodiments, operation 302 generates visual key data 225 that describes a bar code. For example, visual recognition program 215 can generate visual key data 225 that describes a quick response code (QR code), a universal product code (UPC barcode), or any other machine-readable representation of data including a pattern of geometric shapes. In other embodiments, operation 302 can generate visual key data 225 that describes a series of flashes of light; mobile device 120 may display the series of flashes of light on screen 125. A visual key can also be encoded in the pattern of flashes of light and/or in the intensity of the flashes of light.

In operation 304, visual recognition program 215 causes camera 110 to transmit visual key data 225 to, for example, mobile device 120 over network 230.

In operation 306, visual recognition program 215 searches for the visual key described by visual key data 225. In some embodiments, visual recognition program 215 searches for the visual key described by visual key data 225 by causing camera 110 to store one or more images. Visual recognition program 215 searches each image for the visual key described by visual key data 225. In some embodiments, visual recognition program 215 causes camera 110 to capture images at increasing magnifications if visual recognition program 215 identifies a region of an image that may include the visual key. For example, visual recognition program 215 divides an image into a plurality of regions and determine a score for each region. Visual recognition program 215 determines the scores by executing object recognition code, or any other form of visual recognition code known in the art. The score is based, at least in part, on how well the region matches the visual key described by visual key data 225. In some embodiments, visual recognition program 215 includes the ability to model the visual key in three degrees of rotational freedom (yaw, pitch, and roll) in order to account for the orientation of mobile device 120. The resolution and/or processing power of camera 110, however, may limit the amount of distortion that visual recognition program 215 can account for when determining a score for a region. If a region has a score that exceeds a first threshold score, visual recognition program 215 causes camera 110 to capture an image at a higher magnification. Visual recognition program 215 causes camera 110 to capture images at increasing magnifications until visual recognition program 215 identifies a region that has a score above a higher, second threshold score. In such embodiments, visual recognition program determines that the region having a score above the higher, second threshold is the visual key. If visual recognition program 215 finds the visual key described by visual key data 225, visual recognition program 215 proceeds to operation 308.

In operation 308, visual recognition program 215 associates the visual key with the person who physically possesses the visual key. In other words, visual recognition program 215 operates in accordance with an inference that the person who physically possesses the visual key is the photographer or some other person who is authorized to issue gestural commands. In some embodiments, visual recognition program 215 executes object recognition code to analyze an image and associate the visual key with the person who physically possesses the visual key. For example, visual recognition program 215 executes edge detection and/or edge matching code to identify people and/or objects within an image, based, at least in part, on their outlines. Visual recognition program 215 also determines the area of the visual key. In order to determine which person physically possesses the visual key, visual recognition program 215 determines if the visual key overlaps with any of the people within the image. If the visual key overlaps with a person, visual recognition program 215 determines the percentage of the visual key that overlaps with the person. If the percentage of the visual key that overlaps with the person exceeds a threshold percentage, visual recognition program 215 determines that the person physically possesses the visual key. In some embodiments, visual recognition program 215 also considers the orientation of the visual key and/or the orientation or pose of people within the field of view to determine which person physically possesses the visual key. In the embodiment shown in FIG. 1, for example, visual recognition program 215 associates subject 130 with the visual key. As a result of the association, camera 110 executes gestural commands from subject 130 and ignores gestures from subjects 140 and 150, even if visual recognition program 215 recognizes the gestures of subjects 140 and 150. Visual recognition program 215 can use any visual recognition technique known in the art to associate the visual key with the person who physically possesses the visual key.

In other embodiments, visual recognition program 215 associates a paired mobile electronic device with the person who can issue gestural commands using the location of the paired mobile electronic device and any visual recognition technique known in the art. For example, visual recognition program 215 can associate mobile device 120 with subject 130 by determining the location of mobile device 120 relative to camera 110 and tracking the image of the person who occupies that location, i.e. subject 130. Visual recognition program 215 requires that camera 110 and mobile device 120 be able to determine their respective locations with an accuracy that enables visual recognition program 215 to differentiate subject 130, for example, from subjects 140 and 150 based, at least in part, on the location of subject 130. In some embodiments, visual recognition program 215 can determine the location of mobile device 125 utilizing location-finding systems such as the global positioning system (GPS) and radio beacons (e.g., utilizing a Bluetooth standard), provided that such systems have a margin of error sufficient to permit visual recognition program 215 to differentiate the person who can issue gestural commands from other people within the field of view of a camera, for example through the use of triangulation via multiple radio transceivers positioned with sufficient separation relative to one another.

In some embodiments, visual recognition program 215, in operation 310, automatically tracks the person whom visual recognition program 215 associates with the visual key. For example, visual recognition program 215 tracks subject 130 after visual recognition program 215 associates subject 130 with the visual key. Because visual recognition program 215 maintains the association between subject 130 and the visual key, it is not necessary for mobile device 120 to continue to display the visual key while issuing gestural commands. In some embodiments, subject 130 can manually turn screen 125 off. In other embodiments, mobile device 120 can automatically turn screen 125 off after an amount of time. In yet other embodiments, mobile device 120 can turn screen 125 off in response to a signal from camera 110. Camera 110 can be configured to transmit the signal after camera 110 associates subject 130 with the visual key. Camera 110 can also be configured to transmit the signal after camera 110 receives a command to set a self-timer, wherein the signal instructs mobile device 120 to turn screen 125 off before the self-timer expires. Mobile device 120 can also have the ability to turn screen 125 off using any combination of these techniques. In some embodiments, subject 130 must re-associate him or herself with the visual key if subject 130 moves outside of field of view 115. In other embodiments, however, visual recognition program 215 can identify subject 130 using, for example, facial recognition techniques so that subject 130 can re-enter field of view 115 without having to re-associate him or herself with the visual key. Visual recognition program 215 can use any object recognition technique known in the art to identify the person who visual recognition program 215 associates with the visual key.

In operation 312, visual recognition program 215 searches an image for gestural commands from the person whom visual recognition program 215 associates with the visual key. Visual recognition program 215 executes gesture recognition code to model gestures of the person whom visual recognition program 215 associates with the visual key. Visual recognition program 215 can use any technique known in the art to model gestures. In some embodiments, visual recognition program 215 models subject 130, for example, in two dimensions. The two-dimensional models can include models of the fingers, hands, arms, legs, face, or any other part of subject 130. Visual recognition program 215 can model subject 130 as one or more deformable templates. The deformable templates include interpolation nodes from which visual recognition program approximates the outline of subject 130 or the outline of any portion of subject 130. In other embodiments, visual recognition program 215 infers gestures based on a sequence of images of subject 130. In yet other embodiments, visual recognition program 215 models subject 130 as previously described, but in three-dimensions. Three-dimensional models include volumetric and/or skeletal models that more accurately model gestures than two-dimensional models. Visual recognition program 215, however, may require significantly more computational resources to model subject 130 in three dimensions as opposed to two dimensions. In addition, camera 110 may require two or more distributed image sensors in order to accurately model subject 130 in three dimensions.

In decision 314, visual recognition program 215 determines if a modeled gesture corresponds to a gesture that visual recognition program recognizes. If visual recognition program 215 has associated the visual key with the person who possess mobile device 120, visual recognition program 215 can determine if it recognizes a gesture from an image that is different from the image from which visual recognition program 215 identified the visual key and/or associated the visual key with the person in possession of mobile device 120. Visual recognition program 215 includes a library of gesture templates. The gesture templates can be two-dimensional, three-dimensional, or sequences of images in accordance with the embodiments described previously. In some embodiments, visual recognition program 215 determines a goodness of fit between a modeled gesture and a gesture template. If the goodness of fit is greater than a threshold goodness of fit, visual recognition program 215 determines that the modeled gesture corresponds to the gesture template (decision 314, YES branch). If the goodness of fit is less than a threshold goodness of fit, visual recognition program 215 compares the modeled gesture to a different gesture template and/or continues to search for gestures (decision 314, NO branch). Visual recognition program 215 can use any mathematical function to determine how well a modeled gesture corresponds to a gesture template.

In operation 316, visual recognition program 215 causes camera 110 to act on a gesture. Camera 110 acts on a gesture by executing code that corresponds to a gesture template. In the embodiment shown in FIG. 1, for example, subject 130 issues gesture 135. Gesture 135 includes three extended, proximate fingers. In this embodiment, visual recognition program 215, upon recognizing the gesture, causes camera 110 to activate a self-timer and count down for three seconds before taking a photograph at zero seconds. In some embodiments, camera 110 indicates when it initiates the count down. For example, camera 110 can use a light and/or an audible noise to indicate that it has initiated the count down. Visual recognition program 215 can cause camera 110 to activate the self-timer and count down for a different number of seconds based on a gesture that includes a different number of extended, proximate fingers, wherein the length of the countdown corresponds to the number of extended, proximate fingers. The countdown begins when the extended, proximate fingers are retracted or when a different gesture is performed. In some embodiments, visual recognition program 215 causes camera 110 to act on a gesture after visual recognition program 215 recognizes a preliminary gesture. The preliminary gesture authorizes visual recognition program 215 to cause camera 110 to execute commands. In various embodiments, any function of camera 110 can be mapped to a gesture. In some embodiments, a user of camera 110 can map a function of camera 110 to a predefined gesture, i.e., a gesture template for the predefined gesture exists. In other embodiments, a user of camera 110 can create a gesture template using visual recognition program 215 and map a function of camera 110 to the newly created gesture template.

Figure 4:
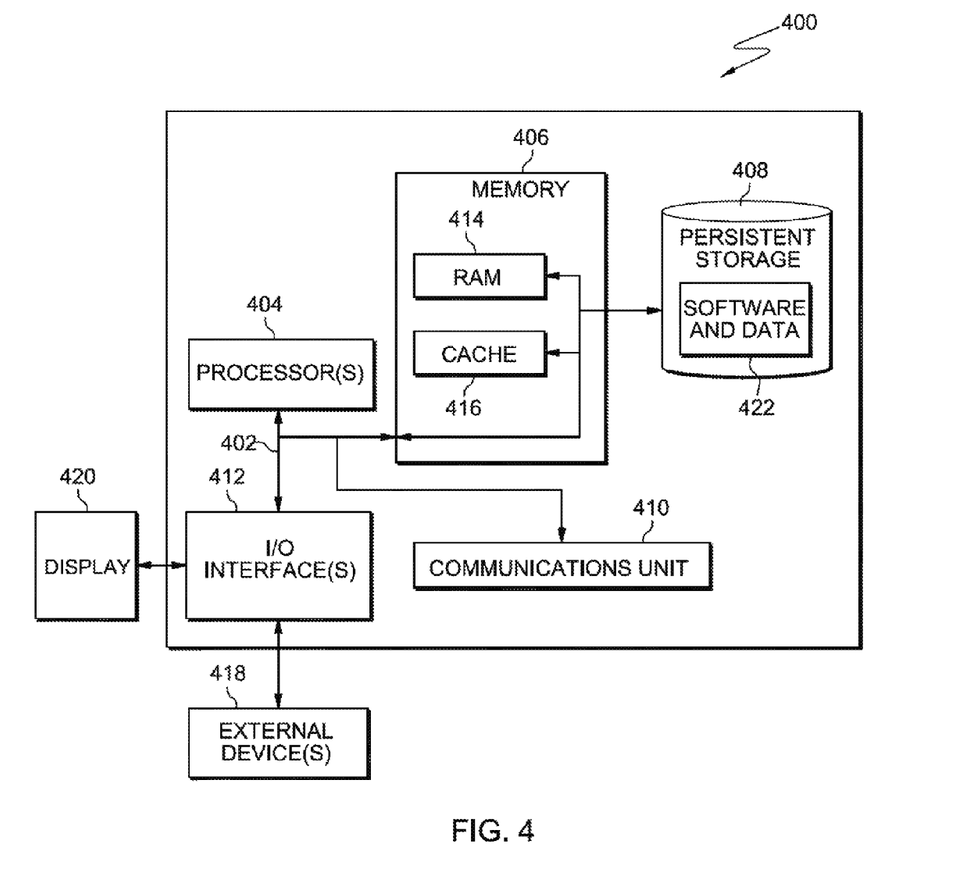
FIG. 4 is a block diagram of components of a computing device executing operations for controlling a digital camera, in accordance with an embodiment of the present disclosure.

FIG. 4 is a block diagram of components of a computing device, generally designated computer system 400, in accordance with an embodiment of the present disclosure. Computer system 400 can store software and data 422. Software and data 422 can include visual recognition program 215. Computer system 400 includes communications fabric 402, which provides communications between computer processor(s) 404, memory 406, persistent storage 408, communications unit 410, and input/output (I/O) interface(s) 412. Communications fabric 402 can be implemented with any architecture designed for passing data and/or control information between processors (such as microprocessors, communications and network processors, etc.), system memory, peripheral devices, and any other hardware components within a system. For example, communications fabric 402 can be implemented with one or more buses.

Memory 406 and persistent storage 408 are computer readable storage media. In this embodiment, memory 406 includes random access memory 414 (RAM). In general, memory 406 can include any suitable volatile or non-volatile computer readable storage media. Cache 416 is a fast memory that enhances the performance of processors 404 by holding recently accessed data and data near accessed data from memory 406.

Program instructions and data used to practice embodiments of the present invention may be stored in persistent storage 408 for execution by one or more of the respective processors 404 via cache 416 and one or more memories of memory 406. In an embodiment, persistent storage 408 includes a magnetic hard disk drive. Alternatively, or in addition to a magnetic hard disk drive, persistent storage 408 can include a solid state hard drive, a semiconductor storage device, read-only memory (ROM), erasable programmable read-only memory (EPROM), flash memory, or any other computer readable storage media that is capable of storing program instructions or digital information.

The media used by persistent storage 408 may also be removable. For example, a removable hard drive may be used for persistent storage 408. Other examples include optical and magnetic disks, thumb drives, and smart cards that are inserted into a drive for transfer onto another computer readable storage medium that is also part of persistent storage 408.

Communications unit 410, in these examples, provides for communications with other data processing systems or devices. In these examples, communications unit 410 includes one or more network interface cards. Communications unit 410 may provide communications through the use of either or both physical and wireless communications links. Program instructions and data used to practice embodiments of the present invention may be downloaded to persistent storage 408 through communications unit 410.

I/O interface(s) 412 allows for input and output of data with other devices that may be connected to each computer system. For example, I/O interface 412 may provide a connection to external devices 418 such as a keyboard, keypad, a touch screen, and/or some other suitable input device. External devices 418 can also include portable computer readable storage media such as, for example, thumb drives, portable optical or magnetic disks, and memory cards. Software and data used to practice embodiments of the present invention can be stored on such portable computer readable storage media and can be loaded onto persistent storage 408 via I/O interface(s) 412. I/O interface(s) 412 also connect to a display 420.

Display 420 provides a mechanism to display data to a user and may be, for example, a computer monitor.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The term(s) "Smalltalk" and the like may be subject to trademark rights in various jurisdictions throughout the world and are used here only in reference to the products or services properly denominated by the marks to the extent that such trademark rights may exist.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the invention. The terminology used herein was chosen to best explain the principles of the embodiment, the practical application or technical improvement over technologies found in the marketplace, or to enable others of ordinary skill in the art to understand the embodiments disclosed herein.

What is claimed is:

1. A method comprising:
   generating, by one or more computer processors, data describing a visual key;
   transmitting, by one or more computer processors, the data describing the visual key;
   capturing, by one or more computer processors, a first image that includes the visual key;
   identifying, by one or more computer processors, the visual key in the first image;
   determining, by one or more computer processors, an outline of a person in the first image based, at least in part, on at least one of edge detection code and edge matching code;
   determining, by one or more computer processors, that a percentage on an area of the visual key that overlaps with an area defined by the outline of the person exceeds a threshold percentage, and in response, associating, by one or more computer processors, the visual key with the person, wherein an association with the visual key authorizes the person to control a camera;
   capturing, by one or more computer processors, a second image that includes a gesture of the person, wherein the first image does not include the gesture; and
   responsive to recognizing, by one or more computer processors, the gesture of the person in the second image, executing, by one or more computer processors, a command that corresponds to the gesture, wherein the command causes the camera to perform a function.

2. The method of claim 1, wherein identifying, by one or more computer processors, the visual key in the first image comprises:
   dividing, by one or more computer processors, the first image into a plurality of regions;
   for a region or the plurality of regions, determining, by one or more computer processors, a score based, at least in part, on how well the region matches the visual key; and
   determining, by one or more computer processors, that the score exceeds a first threshold score, and in response, capturing, by one or more computer processors, a third image, wherein the third image is captured at a higher magnification than the first image.

3. The method of claim 2, wherein identifying, by one or more computer processors, the visual key in the first image further comprises:
   in response to determining, by one or more computer processors, that a score of the region does not exceed a second threshold score, based, at least in part, on how well the third image matches the visual key, capturing, by one or more computer processors, a fourth image, wherein the fourth image is captured at a higher magnification than the third image and includes the region, and wherein the second threshold score is higher than the first threshold score.

4. The method of claim 2, wherein identifying, by one or more computer processors, the visual key in the first image further comprises:
   in response to determining, by one or more computer processors, that a score of the region exceeds a second threshold score, based, at least in part, on how well the third image matches the visual key, identifying, by one or more computer processors, the region as the visual key, wherein the second threshold score is higher than the first threshold score.

5. The method of claim 4, wherein the visual key is a machine-readable pattern of geometric shapes.

6. The method of claim 5, wherein the machine-readable pattern of geometric shapes is a universal product code.

7. The method of claim 5, wherein the machine-readable pattern of geometric shapes is a quick response code.

8. The method of claim 7, wherein the score of the region is based, at least in part, on a model of the visual key that accounts for an orientation of the visual key in at least one of yaw, pitch, and roll.

9. A computer program product for controlling a camera, the computer program product comprising:
   a computer readable storage device and program instructions stored on the computer readable storage device, the program instructions comprising:
      program instructions to generate data describing a visual key;
      program instructions to transmit the data describing the visual key;
      program instructions to capture a first image that includes the visual key;
      program instructions to identify the visual key in the first image;
      program instructions to determine an outline of a person in the first image based, at least in part, on at least one of edge detection code and edge matching code;
      program instructions to determine that a percentage on an area of the visual key that overlaps with an area defined by the outline of the person exceeds a threshold percentage, and in response, execute program instructions to associate the visual key with the person, wherein an association with the visual key authorizes the person to control a camera;
      program instructions to capture a second image that includes a gesture of the person, wherein the first image does not include the gesture; and
      program instructions to, responsive to recognizing the gesture of the person in the second image, execute-a command that corresponds to the gesture, wherein the command causes the camera to perform a function.

10. The computer program product of claim 9, wherein the program instructions to identify the visual key in the first image comprise:
   program instructions to divide the first image into a plurality of regions;
   program instructions to determine, for a region or the plurality of regions, a score based, at least in part, on how well the region matches the visual key; and
   program instructions to determine that the score exceeds a first threshold score, and in response, execute program instructions to capture a third image, wherein the third image is captured at a higher magnification than the first image.

11. The computer program product of claim 10, wherein the program instructions to identify the visual key in the first image further comprise:
   program instructions to, in response to determining that a score of the region does not exceed a second threshold score, based, at least in part, on how well the third image matches the visual key, capture a fourth image, wherein the fourth image is captured at a higher magnification than the third image and includes the region, and wherein the second threshold score is higher than the first threshold score; and
   program instructions to, in response to determining that a score of the region exceeds a second threshold score, based, at least in part, on how well the third image matches the visual key, identify the region as the visual key, wherein the second threshold score is higher than the first threshold score.

12. The computer program product of claim 11, wherein the visual key is a machine-readable pattern of geometric shapes.

13. The computer program product of claim 12, wherein the machine-readable pattern of geometric shapes is a quick response code.

14. The computer program product of claim 13, wherein the score of the region is based, at least in part, on a model of the visual key that accounts for an orientation of the visual key in at least one of yaw, pitch, and roll.

15. A computer system for controlling a camera, the computer system comprising:
   one or more computer processors;
   one or more computer readable storage devices;
   program instructions stored on the one or more computer readable storage devices for execution by at least one of the one or more processors, the program instructions comprising:
      program instructions to generate data describing a visual key;
      program instructions to transmit the data describing the visual key;
      program instructions to capture a first image that includes the visual key;
      program instructions to identify the visual key in the first image;
      program instructions to determine an outline of a person in the first image based, at least in part, on at least one of edge detection code and edge matching code;
      program instructions to determine that a percentage on an area of the visual key that overlaps with an area defined by the outline of the person exceeds a threshold percentage, and in response, execute program instructions to associate the visual key with the person, wherein an association with the visual key authorizes the person to control a camera;
      program instructions to capture a second image that includes a gesture of the person, wherein the first image does not include the gesture; and program instructions to, responsive to recognizing the gesture of the person in the second image, execute a command that corresponds to the gesture, wherein the command causes the camera to perform a function.

16. The computer system of claim 15, wherein the program instructions to identify the visual key in the first image comprise:
  program instructions to divide the first image into a plurality of regions;
  program instructions to determine, for a region or the plurality of regions, a score based, at least in part, on how well the region matches the visual key; and
  program instructions to determine that the score exceeds a first threshold score, and in response, execute program instructions to capture a third image, wherein the third image is captured at a higher magnification than the first image.

17. The computer system of claim 16, wherein the program instructions to identify the visual key in the first image further comprise:
  program instructions to, in response to determining that a score of the region does not exceed a second threshold score, based, at least in part, on how well the third image matches the visual key, capture a fourth image, wherein the fourth image is captured at a higher magnification than the third image and includes the region, and wherein the second threshold score is higher than the first threshold score; and
  program instructions to, in response to determining that a score of the region exceeds a second threshold score, based, at least in part, on how well the third image matches the visual key, identify the region as the visual key, wherein the second threshold score is higher than the first threshold score.

18. The computer system of claim 17, wherein the visual key is a machine-readable pattern of geometric shapes.

19. The computer system of claim 18, wherein the machine-readable pattern of geometric shapes is a quick response code.

20. The computer system of claim 19, wherein the score of the region is based, at least in part, on a model of the visual key that accounts for an orientation of the visual key in at least one of yaw, pitch, and roll.

* * * * *